Patented Dec. 26, 1939

2,185,124

UNITED STATES PATENT OFFICE 2,185,124

COATING COMPOSITION

Roy E. Coleman, Meriden, Conn., assignor to The Zein Corporation of America, a corporation of Delaware No Drawing. Application August 9, 1937, Serial No. 158,215

2 Claims. (Cl. 134—12)

This invention relates to liquid coating compositions and more particularly to substantially non-aqueous stable liquid coating compositions made from zein or other prolamins. The invention set forth herein embodies the methods described and claimed in my copending applications Serial Nos. 158,209, 158,210, 158,211, 158,212, 158,213, and 158,214, filed of even date herewith, although not limited to such methods.

In the following description of my invention I will refer to the preparation of substantially non-aqueous stable solutions of zein derived from corn, but it is of course to be understood that my invention is also applicable to the preparation of coating compositions made from other prolamins such as, for example, gliadin from wheat, hordein from barley, kafirin from kafir and the prolamins from other cereal grains. The above-mentioned prolamins are at present derived by extraction with an aqueous alcohol solution in which the added water varies generally from about 15 to about 40% of the solvent mixture. The material used in accordance with my invention is the dried extract which may be completely dry or the commercial product which contains a small percentage of moisture.

The prior art discloses coating compositions containing zein wherein the zein is dissolved in an organic solvent; however, the prior art coating compositions contain substantial quantities of water and, according to the prior art, zein is not soluble in the organic solvents alone and requires added water to effect solution. In the understanding of the prior art, for example, as stated in the Walsh et al. Patent No. 1,966,604, the addition of water is necessary since the low-molecular alcohols, alcohol ethers and alcohol derivatives are not effective alone in making solutions of zein. The amount of added water used in accordance with the prior art to effect solution of zein in the organic solvents varies according to Walsh et al., from about 5 to 60% and preferably from about 15 to 60%.

The prior art coating compositions made from zein, wherein an organic solvent and added water are used to effect solution of the zein, are not stable over a wide range of concentrations insofar as separation is concerned, especially on standing and at temperatures below 70° F. and particularly below 50 to 70° F. In the few instances in the prior art where reference is made to solutions of zein in an organic solvent and no mention is made of the use of added water, solutions produced in accordance with these disclosures are not stable, and separate on cooling, particularly at temperatures below 70° F. In all of the prior art solutions of zein, there is a very definite and decided tendency to gel on standing.

In accordance with my present invention, I have found that stable liquid coating compositions can be formed from zein by the aid of anhydrous or substantially anhydrous solvents or solvent mixtures, or by solvents or solvent mixtures containing but small amounts of added water. The liquid coating compositions embodying my invention are either anhydrous or substantially non-aqueous, as desired. In the instances where water is present in my coating compositions, the coating compositions are, for all practical purposes, substantially non-aqueous since they preferably contain 5% or less of water and, in most instances, less than 5%. The coating compositions embodying my invention are stable, insofar as separation is concerned, at temperatures of 70° F. and below and in many instances at temperatures of 40° F. and somewhat below. Moreover, these stable coating compositions have a decidedly less tendency to thicken and gel than the heretofore known coating compositions made from zein.

The coating compositions embodying my invention may be made in any desirable manner; however, I prefer to follow the methods set forth in my above-mentioned copending applications filed on even date herewith. Thus, suitable coating compositions may be made by following the method set forth in my above-mentioned copending application, Ser. No. 158,209, wherein controlled proportions of aqueous alcohol are combined with the zein to effect solutions; or by the aid of auxiliary solvents as in my copending application, Serial No. 158,210; or by the aid of direct solvents such as the glycols, the alcohol ethers, and the alcohol derivatives as set forth in my copending applications, Serial Nos. 158,211, 158,212 and 158,213; or by the aid of mixed solvents, and following the lacquer technique as in my copending application, Serial No. 158,214. Reference may be had to each of these cases for the details of the methods therein set forth.

The following detailed descriptions are offered as illustrative examples of coating compositions embodying my invention as well as the methods of preparing the same; however, my invention is not to be construed as limited thereto since other suitable compositions in other suitable proportions are intended to be included within the scope of my claims. In the examples, the term "parts" indicates parts by weight. Also in the examples, when I refer to anhydrous denatured alcohol, I mean ethyl alcohol containing about 7 to 10% of ethyl acetate as a denaturant.

Example 1

10 parts of zein are mixed with 20 parts of 95% alcohol in a suitable vessel and on stirring for about 2 to 3 minutes at temperatures of 75 to 85° F. a clear, straw-colored, stable solution is formed which does not separate on standing even on being cooled down to temperatures of 70° F. and somewhat below.

Example 2

10 parts of zein are mixed with 25 parts of 95% alcohol and stirred for about 2 minutes. A clear, stable solution is formed which has substantially all of the characteristics of the solution obtained in accordance with Example 1.

Example 3

10 parts of zein are mixed with 30 parts of 95% alcohol and on stirring for about 3 minutes a clear, stable solution is formed. In some instances, solutions obtained in accordance with the teachings of this example gelled on standing.

Example 4

10 parts of zein are mixed with 40 parts of a solvent mixture consisting of 90% of 95% ethyl alcohol and 10% of ethylene glycol monomethyl ether. On stirring and with the application of a slight heat in the order of 70 to 80° F. a clear stable solution of the zein in 95% alcohol is obtained in about 5 minutes.

Example 5

10 parts of zein are placed in a vessel and to this 44 parts of 95% alcohol and 6 parts of dioxan are added. The mixture is stirred and on the application of heat in the order of 75 to 85° F. a clear stable solution of the zein is produced in about 5 to 10 minutes.

Example 6

10 parts of zein are mixed with 40 parts of a solvent mixture containing 84% of 95% alcohol and 16% of diethylene glycol. The mixture is stirred and on the application of heat in the order of 85 to 95° F. for about 5 minutes a clear stable solution of the zein is formed.

Example 7

10 parts of zein are mixed with 40 parts of a solvent mixture containing 89% of 95% alcohol and 11% of dichlorethyl ether. The mixture is stirred for about 5 to 10 minutes and on the application of heat in the order of 75 to 85° F. a stable solution of the zein is formed.

Example 8

10 parts of zein are placed in a vessel and to this 40 parts of 95% alcohol and 10 parts of linseed fatty acids are added. The mixture is stirred and upon the application of heat in the order of 90 to 100° F. a stable, slightly cloudy solution of zein is produced in about 15 minutes.

Example 9

10 parts of zein are mixed with 30 parts of diethylene glycol in a suitable vessel. On stirring the mixture at room temperature the zein is converted into a viscous, translucent, semi-plastic mass. On the application of heat in the order of about 150° F. and with continued stirring, a clear, stable solution of the zein in the diethylene glycol is obtained in about 5 to 10 minutes.

Example 10

10 parts of zein are mixed with 30 parts of propylene glycol. On stirring the mixture at room temperature the zein mixes readily with the ethylene glycol but forms no translucent, semi-plastic mass and does not dissolve. On heating to about 160° to 190° F. a perfectly clear, bright, stable solution is obtained in about 8 to 15 minutes.

Example 11

10 parts of zein are mixed with 40 parts of triethylene glycol. On stirring and with the application of heat in the order of 140° to 150° F., a clear, stable solution of the zein in the solvent is obtained in about 6 to 12 minutes.

Example 12

10 parts of zein are mixed with 40 parts of ethylene glycol monomethyl ether in a suitable vessel. On stirring the mixture at room temperature (about 73° F.) for about 3 to 4 minutes, the zein is converted into a viscous, translucent, semi-plastic mass. On continued stirring for about 1 to 6 minutes, a clear, bright, straw-colored, stable solution of the zein in the ether is obtained.

Example 13

10 parts of zein are mixed with 30 parts of diethylene glycol monomethyl ether. On stirring the mixture at room temperature, it is found that the zein mixes readily with the alcohol-ether and forms a cloudy mixture containing considerable agglomerated particles but solution of the zein is not readily effected. On the application of heat in the order of about 150° F. and with continued stirring, a clear, stable solution of the zein in the alcohol-ether is obtained in about 8 to 15 minutes.

Example 14

10 parts of zein are mixed with 30 parts of ethylene glycol monomethyl ether. On stirring the mixture for about 5 to 7 minutes at room temperature, the zein is converted into a viscous, translucent mass. On continued stirring for about 2 to 8 minutes and with the application of a slight heat in the order of 80° F., a clear, bright, stable solution is obtained.

Example 15

10 parts of zein are mixed with 40 parts of diethylene glycol monomethyl ether. The mixture mixes well at room temperature but does not quickly dissolve. On stirring for about 5 minutes and with the application of heat in the order of 90–95° F. the zein begins to go into solution. On continued stirring for about 3 to 7 minutes and with the further application of heat in the order of 100° to 105° F. a clear, bright stable solution of the zein is produced.

Example 16

10 parts of zein are mixed with 40 parts of ethylene glycol monoethyl ether. The mixture mixes well at room temperature but does not dissolve. On stirring for about 5 minutes and with the application of heat in the order of 95° to 100° F. the zein begins to go into solution. On continued stirring for about 5 to 10 minutes and with the further application of heat in the order of 110 to 125° F. a clear bright stable solution of the zein is produced.

Example 17

10 parts of zein are mixed with 40 parts of diacetone alcohol in a suitable vessel. On standing and with the application of heat in the order of 120° to 130° F., the zein becomes plastic and separates from the solvent. At these temperatures the zein does not appear to dissolve in the solvent. On continued stirring and with the application of heat in the order of 160° F., the zein forms a gelatinous mass. On further stirring and on the application of heat in the order of 190° to 200° F. a colloidal solution is formed which is slightly cloudy. This colloidal solution is formed in about 10 to 15 minutes. On cooling and standing, the solution becomes quite viscous, but turns clear and remains stable.

Example 18

10 parts of zein are mixed with 30 parts of diacetone alcohol. On stirring and with the application of heat in the order of 130° to 135° F., the zein becomes plastic and separates from the solvent as in Example 17. On continued stirring and with the application of heat in the order of 170° F., the zein forms a gelatinous mass. On further stirring and on the application of heat in the order of 210° to 225° F. a colloidal solution is formed which has a slightly milky cloudiness. This colloidal solution is formed in about 12 to 20 minutes. On cooling and standing, the solution becomes quite viscous and turns clear and remains stable.

Example 19

10 parts of zein are mixed with 10 parts of a solvent mixture containing 50% of benzyl alcohol and 50% of furfuryl alcohol. On stirring and with the application of heat in the order of 190 to 200° F., a stable solution of the zein in the solvent mixture is obtained in about 10 to 15 minutes.

Example 20

10 parts of zein are mixed with 20 parts of a solvent mixture containing 50% of benzyl alcohol and 50% of 95% alcohol. On stirring and with the application of heat in the order of 108 to 112° F. a stable solution of the zein in the solvent mixture is obtained in about 5 to 8 minutes.

Example 21

10 parts of zein are mixed with 20 parts of a solvent mixture containing 50% of benzyl alcohol and 50% of anhydrous denatured alcohol. On stirring and with the application of heat in the order of about 90 to 110° F., a stable solution of the zein in the solvent mixture is obtained in about 5 to 8 minutes.

Example 22

10 parts of zein are mixed with 30 parts of a solvent mixture containing 66.7% of 95% alcohol and 33.3% of acetone. On stirring and with the application of heat in the order of about 80 to 85° F., a stable solution is obtained in about 5 minutes.

Example 23

10 parts of zein are mixed with 30 parts of a solvent mixture containing 33⅓% of ethylene glycol monomethyl ether and 66⅔% of ethylene dichloride. On stirring and with the application of heat in the order of about 108 to 112° F., a stable solution is obtained in about 8 to 12 minutes.

Example 24

10 parts of zein are mixed with 30 parts of a solvent mixture containing 50% of ethylene glycol monomethyl ether and 50% of anhydrous denatured alcohol. On stirring and with the application of heat in the order of 80 to 85° F., a stable solution is obtained in about 3 to 5 minutes.

Example 25

10 parts of zein are mixed with 35 parts of a solvent mixture containing 85.7% of diethylene glycol and 14.3% of ethyl acetate. On stirring and with the application of heat in the order of 170 to 180° F., a stable solution is obtained in about 5 to 10 minutes.

Example 26

10 parts of zein are mixed with 35 parts of a solvent mixture containing 22.2% of diethylene glycol monomethyl ether and 77.8% of cyclohexanol. On stirring and with the application of heat in the order of about 165 to 170° F., a stable solution is obtained in about 8 to 12 minutes.

Example 27

10 parts of zein are mixed with 40 parts of a solvent mixture containing 87.5% of ethylene glycol monomethyl ether and 12.5% of ethylene glycol monobutyl ether. On stirring and with the application of heat in the order of about 90 to 95° F., a stable solution is obtained in about 5 minutes.

Example 28

10 parts of zein are mixed with 40 parts of a solvent mixture containing 75% of ethyl lactate and 25% of tri-cresyl phosphate. On stirring and with the application of heat in the order of about 140 to 150° F., a stable solution is obtained in about 10 to 15 minutes.

Example 29

10 parts of zein are mixed with 40 parts of a solvent mixture containing 50% of 95% alcohol, 25% of ethylene glycol monomethyl ether and 25% of tri-cresyl phosphate. On stirring and with the application of heat in the order of about 120 to 125° F., a stable solution is obtained in about 5 to 10 minutes.

Example 30

10 parts of zein are mixed with 40 parts of a solvent mixture containing 90% of diethylene glycol and 10% of anhydrous denatured alcohol. In practice, the zein is heated with the diethylene glycol to a temperature in the order of about 190 to 195° F. to form a solution. The solution is permitted to cool to about 130 to 135° F., at which temperature the anhydrous denatured alcohol is added. The solution formed is stable.

Example 31

10 parts of zein are mixed with 45 parts of a solvent mixture containing 55.5% of ethylene glycol monomethyl ether and 45.5% of acetone. On stirring and with the application of heat in the order of about 110 to 120° F., a stable solution is obtained in about 5 to 10 minutes.

Example 32

10 parts of zein are mixed with 45 parts of a solvent mixture obtaining 77.8% of ethylene glycol monoethyl ether and 22.2% of amyl alcohol. On stirring and with the application of heat in the order of about 100 to 110° F., a stable solution is obtained in about 3 to 5 minutes.

Example 33

10 parts of zein are mixed with 50 parts of a solvent mixture containing 40% of 95% alcohol and 60% of dichlorethyl ether. On stirring and with the application of heat in the order of about 85 to 95° F., a stable solution is obtained in about 3 to 5 minutes.

Example 34

10 parts of zein are mixed with 55 parts of a solvent mixture containing 36.4% of 95% alcohol and 63.6% of dioxan. On stirring and with the application of heat in the order of about 80 to 90° F., a stable solution is obtained in about 3 to 5 minutes.

Example 35

10 parts of zein are mixed with 56 parts of a solvent mixture containing 53.6% of diethylene glycol monoethyl ether, 35.7% of ethyl methyl ketone and 10.7% of diethyl phthalate. On stirring and with the application of heat in the order of about 80 to 85° F., a stable solution is obtained in about 5 to 10 minutes.

Example 36

10 parts of zein are mixed with 60 parts of a solvent mixture containing 16⅔% of benzyl alcohol and 83⅓% of anhydrous denatured alcohol. On stirring and with the application of heat in the order of about 100 to 110° F., a stable solution is obtained in about 5 to 10 minutes.

Example 37

10 parts of zein are mixed with 80 parts of a solvent mixture containing 50% of diacetone alcohol and 50% of 95% alcohol. In practice, the zein is mixed with the diacetone alcohol and heated to about 190 to 200° F., for about 8 to 12 minutes to effect solution. The solution is then cooled to about 130 to 140° F., and the 95% alcohol is then added. The solution formed is stable.

Example 38

10 parts of zein are mixed with 125 parts of a solvent mixture containing 40% of cyclohexanol, 40% of 95% alcohol, 10% of toluol, and 10% of linseed fatty acids. In practice, the zein is heated in the cyclohexanol to about 190 to 200° F., to effect solution. The solution is then cooled to about 130° F., and the other ingredients are added. The solution formed is stable.

Example 39

10 parts of zein are mixed with 200 parts of a solvent mixture containing 40% of propylene glycol and 60% of 95% alcohol. In practice, the zein is heated in the propylene glycol to about 165 to 170° F., to effect solution. The solution is then cooled to about 130° F. and the 95% alcohol is then added. The solution formed is stable.

In Examples 4 to 8, I employ methods of preparing coating compositions by the aid of auxiliary solvents which are used to stabilize alcoholic solutions of zein. The auxiliary solvents employed in accordance with my invention may be common lacquer solvents or lacquer plasticizers such as, for example, dioxan; the polyhydric alcohols such as ethylene glycol, diethylene glycol, triethylene glycol and the like; the glycol ethers such as ethylene glycol monomethyl ether, ethylene glycol monoethyl ether, diethylene glycol monomethyl ether, diethylene glycol monoethyl ether and the like; ethylene dichloride, tetrachlorethylene and di-chlorethylether; the ethanolamines such as mono- and tri-ethanolamines; the liquid fatty acids such as oleic and linseed; the esters such as dimethyl phthalate, diethyl phthalate, dibutyl phthalate, tri-cresyl phosphate and the like; and high boiling ketone-alcohols such as diacetone alcohol and the like.

The quantity of auxiliary solvent employed in carrying out my invention may vary from about 2 to about 25% of the alcohol and even up to 45% and higher. In most instances 10 to 15% of the auxiliary solvent in respect of the alcohol has been found sufficient to effect the desired stable coating composition made from solutions of zein in alcohol. In general, the concentration of zein in the coating composition varies from about 1 part by weight of zein to over 3 and about 4 or more parts by weight of the alcohol or alcohol and auxiliary solvent, but the proportions may be varied widely in accordance with the properties desired in the product. The coating compositions may be formed in about 3 to 20 minutes, and if heat is required to effect solution of the zein, temperatures in the order of 70 to 140° F. are generally sufficient.

In Examples 9, 10 and 11, I illustrate methods of preparing my coating compositions by the aid of direct glycol solvents; in Examples 12 to 16 I illustrate methods for preparing my coating compositions with the aid of direct alcohol ether solvents; and in Examples 17 and 18 I illustrate methods for preparing my coating compositions by the aid of direct ketone-alcohol solvents. It is of course obvious that other known glycols, alcohol-ethers and ketone-alcohols may be substituted for those mentioned in Examples 9 to 18 inclusive, as may also benzyl alcohol, cyclohexanol, furfuryl alcohol and the like or any mixture of these direct solvents. In general, a stable solution of the zein in these direct glycols, alcohol-ethers and ketone-alcohol solvents may be obtained in about 5 to 25 minutes and in most instances satisfactory stable coating compositions have been obtained in about 5 to 15 minutes with the utilization of heat in the order of about 80 to 300° F. and in one instance, as low as 73° F.

The quantity of these direct solvents necessary to effect solution of the zein to prepare my coating compositions may vary from about 1 to 20 or more and preferably from 2 to 9 or more parts by weight of the solvent to 1 part by weight of the zein. In most instances 2 to 5 parts by weight of the solvent to 1 part by weight of the zein has been found sufficient to effect the desired formation of the stable solutions of the zein in these direct solvents. It is, of course, obvious that the consistency of the coating compositions obtained by practicing the methods set forth in Examples 9 to 18 inclusive is dependent upon the quantity of solvent used.

In Examples 19 to 39 inclusive I illustrate methods for preparing my coating compositions by the aid of mixed solvents. Of these solvents, at least one should be in and of itself a direct solvent for zein or have the capacity of initiating solubility of the zein. The other solvent or solvents in the solvent mixture may be direct solvents for zein, or non-solvents for zein that are compatible with the solvent mixture, or mixtures of these solvents.

Of the direct or initiating solvents used in accordance with the methods set forth in Examples 19 to 39 inclusive mention may be made of the low-molecular weight alcohols such as, for example, aqueous ethanol and preferably the low-molecular weight alcohols containing 5% or less of water such as, for example, 95% or 96% alcohol; the glycols such as ethylene glycol, diethylene glycol, tri-ethylene glycol, propylene glycol and the like; the glycol ethers such as ethylene glycol monomethyl ether, ethylene glycol monoethyl ether, diethylene glycol monomethyl ether, diethylene glycol monoethyl ether and the like; the hydroxy acids and esters such as lactic acids, ethyl lactate and the like; and the high-boiling ketone-alcohols such as, for example, diacetone alcohol. Benzyl alcohol, cyclohexanol, furfuryl alcohol and other closed chain alcohols may likewise be used as well as any mixture of the direct or initiating solvents. The glycols, glycol ethers and ketone-alcohols as well as the other direct solvents mentioned above may, if desired, contain some added water, preferably not over 5%; however, I prefer to use the substantially non-aqueous direct solvents.

Of the non-solvents or those in general incapable of effecting solubility of zein as mentioned in Examples 19 to 31 inclusive, mention may be made of the common lacquer solvents or lacquer plasticizers and the like such as, for example, dioxan; the ketones such as acetone, methyl ethyl ketone, di-isobutyl ketone and the like; the esters such as methyl acetate, ethyl acetate, ethyl butyrate, butyl butyrate, glycol diacetate, the esters of the glycol ethers and the like; the butyl alcohol ethers such as ethylene glycol monobutyl ether, diethylene glycol monobutyl ether and the like; the alcohols such as butanol, isobutanol, amyl alcohol, octyl alcohol and the like; the hydrocarbons such as benzene, toluene, xylene, cyclohexene and the like; chlorinated compounds such as ethylene dichloride, monochloro benzene, ortho-dichlorobenzene, dichloroethyl ether and the like; furane derivatives such as furfuryl acetate, furfural and the like; and plasticizing esters such as dimethyl phthalate, diethyl phthalate, dibutyl phthalate, tricresyl phosphate and the like. It is obvious from the foregoing that other well-known common lacquer solvents, lacquer plasticizers and the like may be used in lieu of those hereinabove set forth.

Suitable coating compositions can be obtained by the use of mixed solvents as mentioned above, either with or without the application of heat. In the instances where heat is necessary, satisfactory results have been obtained with temperatures varying from about 80 to 200° F. and in some instances higher. A stable solution of the zein in the mixture of solvents is obtained generally in about 3 to 30 minutes and in most instances satisfactory solutions have been obtained in about 5 to 15 minutes with the utilization of heat in the order of about 80 to 135° F.

The quantity of mixed solvents necessary to effect solution of the zein may vary from about 1 to 20 or more and preferably 2 to 9 or more parts by weight of the mixed solvent or solvent mixture to 1 part by weight of the zein. In most instances 2 to 5 parts by weight of the solvent mixture to 1 part by weight of the zein has been found sufficient to effect the desired formation of the stable solutions of the zein in the mixed solvents; however, the most practical working solutions have been obtained with the aid of 3 or 4 parts by weight of the solvent mixture to 1 part by weight of the zein.

The relative quantities of direct solvents and non-solvents in the solvent mixtures may vary widely. I have obtained satisfactory results with a solvent mixture wherein the direct solvent or mixture of direct solvents varies from about 15 to 60% and up to 100% and the non-solvent varies from about zero to about 85%. In general, I have obtained satisfactory results with solvent mixtures wherein the major portion thereof is a direct solvent and the minor portion a non-solvent and vice versa. The relative quantities of direct solvent and non-solvent employed in a solvent mixture in accordance with my invention is, of course, dependent upon the characteristics and properties desired in the ultimate solution.

The liquid coating compositions embodying my invention are stable on standing at temperatures of 70° F. and below and do not separate even when cooled to temperatures of 50 to 70° F. and somewhat below. These coating compositions when cooled to temperatures below the limits set forth above, may separate or become solid; however, on reheating again to temperatures of from about 45 to 70° F. a re-solution is effected either without, or with slight stirring and these solutions returned to their normal form at the reheating temperatures. The coating compositions embodying my invention are characterized by the face that they do not separate at the temperatures stated, have a decidedly less tendency to thicken and gel than solutions containing added water, as in the prior art, and in that they contain no added water or only a very slight percentage of water and are, therefore, substantially non-aqueous. Preferably, my coating compositions contain from zero to 5% of added water and slight increases in the water content are not precluded. The coating compositions in general appear to be clear to the naked eye and do not possess pronounced turbidity.

The coating compositions embodying my invention have the unusual property of being able to "give up" their solvent or solvents readily when applied to any surface and they readily form tough, flexible, non-tacky, hard and generally transparent films. The films are very strong and have unusual adhesive properties. They are not inflammable to the extent of such substances as nitrocellulose, pyroxylin and the like. The films are oil resistant and provide an excellent printing surface for any type of ink. With the aid of these coating compositions, the film forming properties thereof can be built up to produce a film of greater toughness, flexibility, hardness and gloss than is capable of being formed from coating compositions containing added water as in the prior art.

The coating compositions may be applied to any surface such as, for example, varnished, lacquered, rubber coated or cellulose derivative coated surfaces. They may be used for coating, sizing, impregnating and water-proofing any material such as paper, textiles, wood, porous stone, wood pulp and the like. When coated on paper, Cellophane, glass and the like, a film is formed almost immediately, which possesses the film characteristics set forth above. Since these coating compositions have decided adhesive properties they may be used for uniting or laminating paper, cloth, wood, glass, felt, Cellophane, metals and metal foils and the like.

The characteristics of the coating compositions and hence of the ultimate films can be altered at will and as desired by the inclusion in the coating composition of diluents, modifiers or plasticizers, pigments, fillers and the like.

The diluents used in accordance with my invention may be, for example, ethanol, denatured alcohol, dioxan, or any of the conventional lacquer diluents which are compatible with the solvents employed in the coating compositions.

The modifiers or plasticizers used in accordance with my invention may be, for example, conventional compatible lacquer plasticizers such as tri-cresyl phosphate, dibutyl phthalate, and the like; animal or vegetable oils, waxes, fats, sulphonated oils and fats and the sulphonated fatty alcohols having 8 or more carbon atoms in the chain; natural and artificial resins; sugars of the mono-, di- and poly-saccharid groups; phenolic substances such as phenols, naphthols, anthracene, naphthalene and the like; preservatives such as benzoic acid and its esters, terpenes and related compounds.

The choice and quantity of diluents, modifiers, plasticizers, and preservatives used in accordance with my invention is, of course, influenced by the purpose intended, the compatibility of these materials in the solutions, the specific properties desired in the coating compositions and the films as well as by the known characteristics of the diluents, modifiers, plasticizers and preservatives utilized.

The fillers used in accordance with my invention may suitably be starch or fibre obtained from zein during the purification thereof, or some other suitable inert, fibrous, powdery material such as cork, mica, sawdust, chalk, magnesite, clay, bentonite or equivalent colloidal clays, charcoal dust and the like. Any suitable color may be imparted to the coating compositions as by a pigment or dye such as, for example, titanium oxide, satin-white, zinc oxide, methyl violet, and the like.

In the claims when I use the expression "substantially non-aqueous" I refer to coating compositions made from zein or the other prolamins wherein the added water, if any, is 5% or less and wherein the concentration of the zein in the solvent or solvents varies from about 1 part by weight of the zein to about 1 to 20 or more and preferably 2 to 9 or more parts by weight of the solvent or solvents. When I use the expression "stable" I mean coating compositions which do not separate on standing or even when cooled to temperatures of 50 to 70° F. and in some instances lower, and have a decidedly less tendency to thicken and gel than solutions containing added water, as in the prior art, and have substantially no pronounced turbidity.

I claim:

1. A substantially non-aqueous liquid coating composition comprising a substantially non-aqueous solution of zein in 95% alcohol wherein the concentration of zein in alcohol varies from about 1 part by weight of zein to 2 to 3 parts by weight of the alcohol, said composition containing not in excess of about 5% of added water and being stable against separation of the zein at temperatures of 70° F.

2. A substantially non-aqueous liquid coating composition comprising a substantially non-aqueous solution of zein in ethyl alcohol wherein the concentration of zein in alcohol varies from about 1 part by weight of zein to about 2 parts by weight of the alcohol, said composition containing not in excess of about 5% of added water and being stable against separation of the zein at temperatures of 70° F.

ROY E. COLEMAN.